United States Patent
White et al.

[11] Patent Number: 5,931,019
[45] Date of Patent: Aug. 3, 1999

[54] BAIT TRAY INSERT ASSEMBLY FOR PORTABLE COOLER

[76] Inventors: Richard W. White; Robert J. White, both of Whites Marina 846 No. Dixie Highway, Lantane, Fla. 33462

[21] Appl. No.: 08/971,486

[22] Filed: Nov. 15, 1997

[51] Int. Cl.⁶ .................................................. F25D 3/08
[52] U.S. Cl. ...................................... 62/457.7; 220/23.89
[58] Field of Search ............................... 220/23.87, 23.89, 220/592.03, 915.2; 62/457.1, 457.7; 312/351, 404

[56] References Cited

U.S. PATENT DOCUMENTS

| | | | |
|---|---|---|---|
| 1,187,498 | 6/1916 | Castle | 220/23.89 |
| 2,820,446 | 1/1958 | Freeman | 220/23.89 |
| 2,994,694 | 7/1961 | Kinsey | 220/23.89 |
| 3,255,607 | 6/1966 | Bair et al. | 220/915.2 |
| 3,443,396 | 5/1969 | Ziolkowski | 62/377 |
| 3,971,231 | 7/1976 | Derry | 62/457.1 |
| 4,565,074 | 1/1986 | Morgan | 220/23.87 |
| 5,052,184 | 10/1991 | Jarvis | 62/60 |
| 5,052,185 | 10/1991 | Spahr | 62/60 |
| 5,319,937 | 6/1994 | Fritch et al. | 62/457.7 |
| 5,433,085 | 7/1995 | Rogers | 62/457.1 |
| 5,437,165 | 8/1995 | White | 62/465 |

Primary Examiner—William E. Tapolcai
Attorney, Agent, or Firm—Alvin S. Blum

[57] ABSTRACT

A dynamic tray for dry storage of bait and other items rests on the ice in a cooler and remains resting as it melts. The tray has a perforated flat bottom panel and upstanding sides. Protuberances extend outwardly from the top of the sides and fit into vertical slots in the walls of many conventional coolers. These slots extend part way down from the top of the cooler. When the protuberances engage the ends of the slots as the ice melts, the tray is prevented from further downward movement that might immerse the tray in melt water. An accessory static tray has upstanding sides with a top outwardly directed flange that engages a ridge near the top of the cooler chamber. This holds the tray at a fixed position above the dynamic tray. Sealed frozen packages of water may be held on the tray so that items on the dynamic tray are cooled from above as well as below.

6 Claims, 2 Drawing Sheets

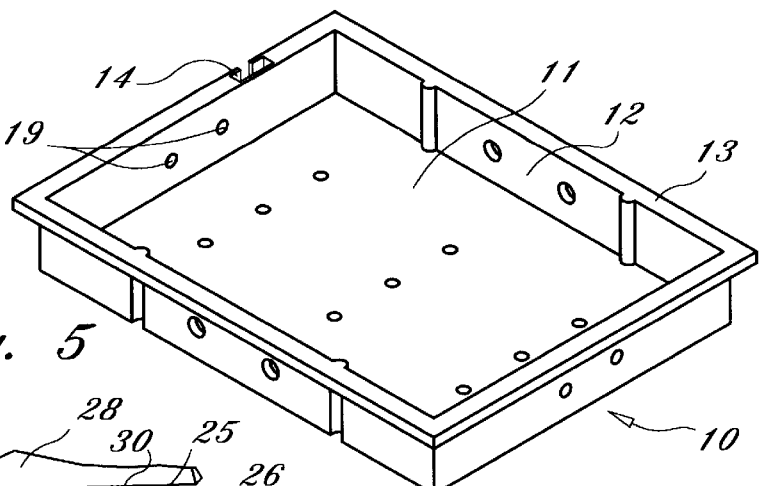
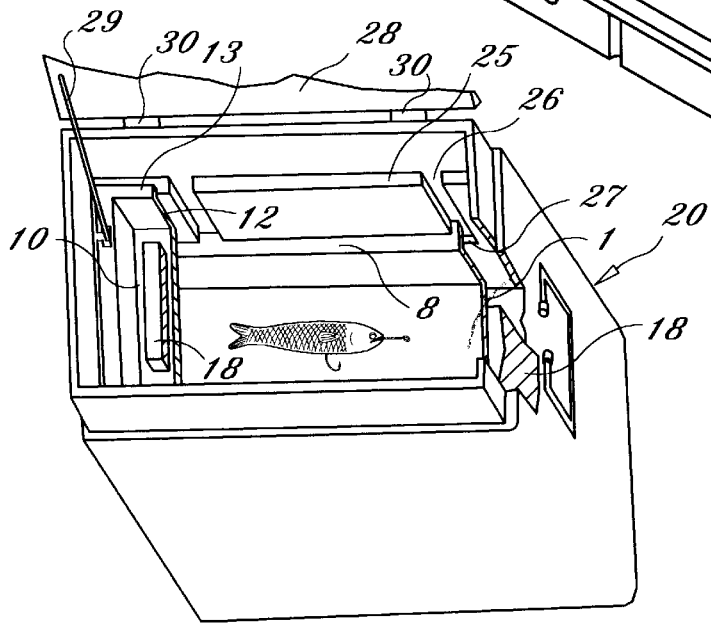
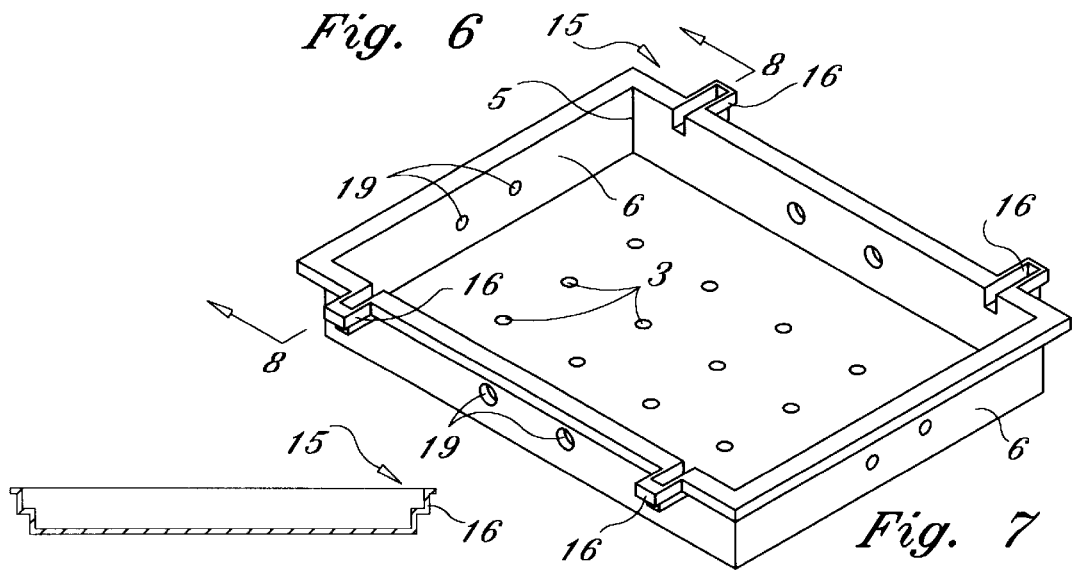

BAIT TRAY INSERT ASSEMBLY FOR PORTABLE COOLER

BACKGROUND OF THE INVENTION

This invention relates to portable coolers or insulated ice chests, and, more particularly, to a cooler insert assembly for maintaining fishing bait in a very cold state while keeping it dry over melting ice.

Fishing bait such as small fish are often rigged in advance with hooks and leaders ready for use. They must be ready for use, yet must be stored for prolonged periods prior to use. They are best stored at, or close to, the temperature of melting ice (0° C.). They must also be kept dry. They are sometimes wrapped and dropped onto the ice in a cooler for cold storage. However the wrappings may leak and the packages get lost in the water and ice. Wrapping and unwrapping the bait is awkward and time consuming.

Spahr in U.S. Pat. No. 5,052,185 discloses a flat grid rack that rests on the melting ice. It has no sides. It is for use with crushed ice to pack it down flat and slow the melting. With a rocking boat and block ice, the rack would tilt and the items stored thereon would slide off. As the ice melted, rack and items would be submerged or floating. Soggy bait rapidly deteriorates.

Applicants' U.S. Pat. No. 5,437,165 discloses a perforated panel without sides and with downwardly extending legs to maintain the panel at a fixed height in a cooler. As the ice melts, the panel gets farther from the ice.

Jarvis, in U.S. Pat. No. 5,052,184 also teaches a grid platform without sides positioned at a fixed elevation in the cooler by downwardly directed legs. Food stored on the platform is cooled by ice on the platform. Melt water drains through the grid and collects at the bottom of the cooler to cool beverage cans. Cans are accessed by a door in the platform.

It would be advantageous to provide a tray with sides and a flat bottom for ease in loading and unloading bait. It would be useful to provide such a tray that would rest upon the ice as it melted, yet would not descend into the melt water to keep the tray contents from immersion.

SUMMARY OF THE INVENTION

It is, accordingly, an object of the invention to provide an insert assembly for a portable cooler that will have a dynamic storage container with open top, upright sides and a flat perforated bottom that will ride freely resting on ice in the cooler for optimal cooling. It is another object that means be provided for limiting the level of descent of the container so that the perforated bottom does not become immersed in melt water. It is yet another object that the container be provided with means to prevent its tilting while resting on the ice. It is yet another object to provide an overlying static tray with fixed elevation for storing items such as frozen "blue ice" packages for further cooling of the underlying container.

These and other objects, advantages and features of the invention will become more apparent when the detailed description is studied in conjunction with the drawings, in which like elements are designated by like reference characters in the various drawing figures.

BRIEF DESCRIPTION OF THE DRAWINGS

FIG. 5 is a perspective view of the static tray of the invention.

FIG. 6 is a perspective view partially broken away, of a cooler with the dynamic tray of FIG. 1 and the static tray of FIG. 5 in place.

FIG. 7 is a perspective view of another embodiment of the dynamic tray of the invention.

FIG. 8 is a sectional view taken on line 8—8 of FIG. 7.

DETAILED DESCRIPTION OF PREFERRED EMBODIMENTS

Figure 1:
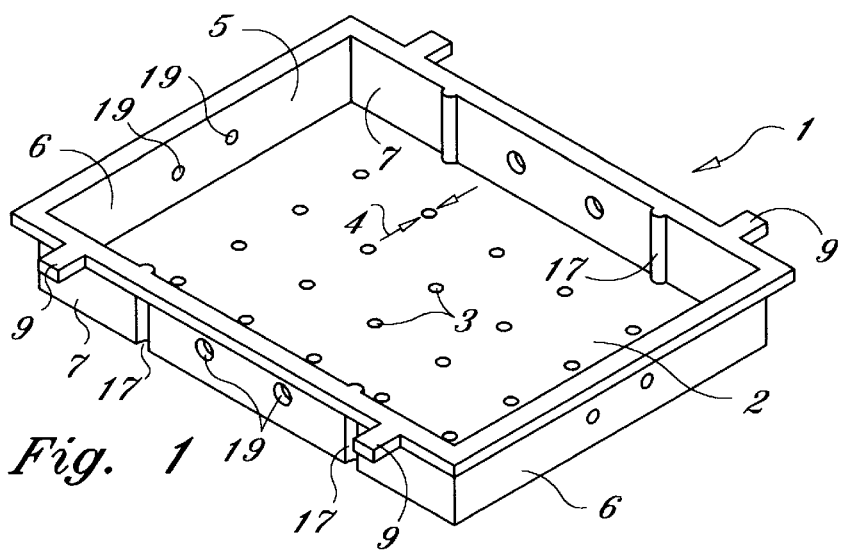
FIG. 1 is a Perspective view of a dynamic tray of the invention.
Figure 2:
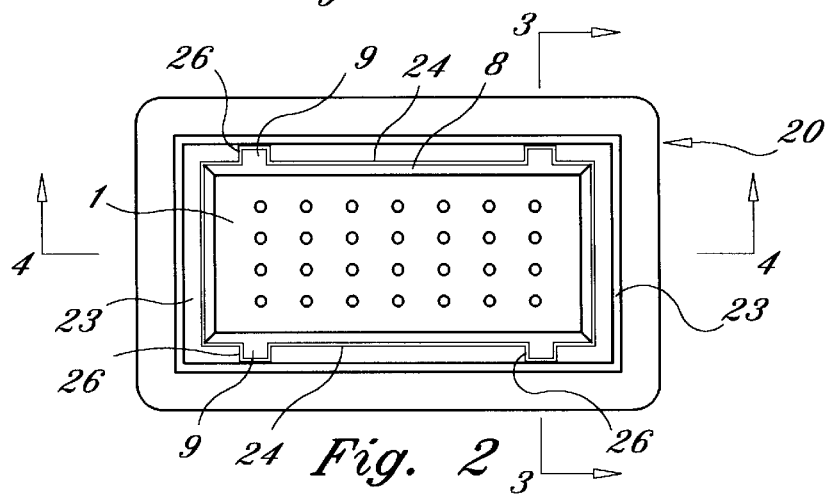
FIG. 2 is a top view of the tray of FIG. 1 in a cooler.
Figure 3:
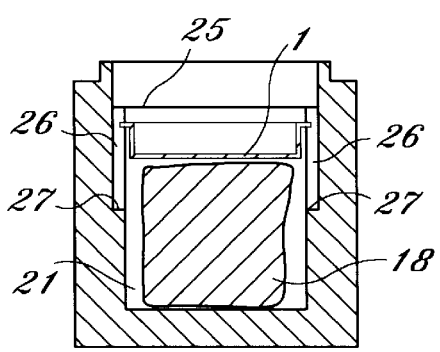
FIG. 3 is a sectional view taken on line 3—3 of FIG. 2.
Figure 4:
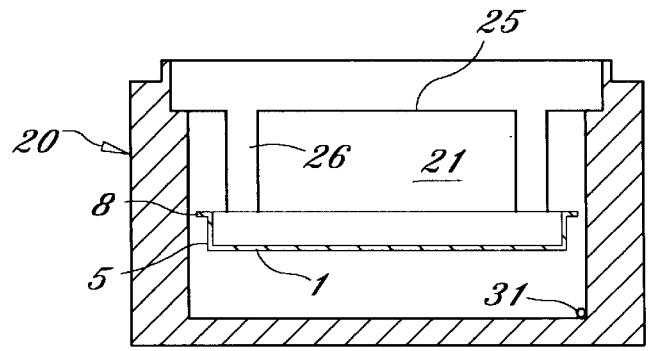
FIG. 4 is a sectional view taken on line 4—4 of FIG. 2.

Referring now to FIGS. 1–4, a conventional portable cooler or ice chest 20 is shown. It has an inner chamber 21 with a bottom 22, two opposed short sides 23, and two opposed long sides 24 upstanding from the bottom. A horizontal ridge 25 extends around all sides near the top of the chamber. The long sides each have two vertical grooves 26 extending downward from the ridge 25 to an end point 27 that may be about 17 centimeters above the bottom. A drain hole 31 may be provided to drain melt water. The cooler insert assembly shown adapts the conventional cooler to the special purpose of enhanced dry cold storage using the dynamic tray 1.

Tray 1 has a flat bottom panel 2 for stable resting on a flat support surface when loading or unloading. Bottom panel 2 is provided with multiple small perforations 4 to drain fluids and provide enhanced heat exchange with ice on which it rests. The perforations may be more than twelve and are less than 2 centimeters across. Upstanding from the bottom panel is a perimeter 5 comprising two opposed short side panels 6 and two opposed long side panels 7. The upper edge of perimeter 5 terminates in an outwardly extending top flange 8. This provides rigidity to the tray and facilitates fabrication. Vertical stiffening elements 17 may also be provided. The flange extends outward to form the protuberances 16. These protuberances are positioned and dimensioned to fit into the grooves 26 in the cooler side walls. The tray 1 is so dimensioned that it slides freely up and down with the protuberances 16 sliding in grooves 26. The tray will rest on ice 18 for enhanced cooling of the tray contents. As the ice melts, the tray will follow until the protuberances are arrested at the groove end points 27. This will define the lowest position of the tray to prevent it dropping into melt water at the chamber bottom.

Referring now to FIGS. 5 and 6, a cooler 20 has a lid 28 held by hinges 30, and in the open position by strap 29. An accessory, static receptacle 10 has a flat horizontal bottom plate 11, an encircling vertical rim 12 upstanding from the bottom. A horizontal flange 13 extends outwardly from the top of the rim. The receptacle 10 is so dimensioned that when inserted in the cooler, flange 13 rests on top of the ridge 25 on the cooler walls. The flange may be provided with an aperture 14 to enable the lid holding strap to pass therethrough. The static tray may be used to hold sealed frozen containers of water or "blue ice" so that the items on the dynamic tray 1 below have a cold surface above as well as below to restrict radiative heat loss. The tray 10 may also hold other items such as food. The tray 1 may also be used to store items other than bait for enhanced cold and dry storage.

Finger holes 19 may be provided at various points on either tray for convenience of lifting the trays from the cooler.

Referring now to FIGS. 7 and 8, another embodiment of the dynamic tray 15 is shown, in which protuberances 16 extend downwardly from the top flange along the side panel at least part way to the bottom. This configuration reduces the tendency of the tray to tip inside the cooler. It also increases the lowest elevation position of the tray after the ice has melted.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention.

What is claimed is:

1. A cooler insert assembly for dry cold storage of items in a cooler that has a chamber with a bottom, two opposed short sides and two opposed long sides upstanding from the bottom, the long sides having at least two vertical grooves extending from a ridge near the top of the chamber to an end point at least ten centimeters above the chamber bottom, the insert assembly comprising:

a tray for cold storage of items, the tray comprising:

A) a bottom panel having perforations, numbering more than twelve and dimensioned less than 2 centimeters across, passing therethrough for enhanced heat transfer with ice that may be stored below the tray;

B) a continuous perimeter upstanding from the bottom panel, the perimeter comprising two opposed short side panels and two opposed long side panels, each of the long side panels being provided with at least two protuberances extending outward from the space enclosed by the perimeter, the protuberances being positioned so as to extend into the vertical grooves in the cooler walls, the tray being dimensioned so as to ride freely up and down in the cooler chamber and rest upon ice stored in the chamber as it melts, the lower limit of motion of the tray being defined by the protuberances resting on the end points at the lower ends of the grooves in the chamber walls.

2. The assembly according to claim 1, in which the perimeter extends upward from the bottom panel at least five centimeters and terminates at the upper edge thereof in an outwardly extending top flange, the protuberances being located in the top flange.

3. The assembly according to claim 2 further comprising an accessory receptacle for separate cold storage of articles above the tray, the receptacle comprising a horizontal bottom plate, an encircling vertical rim upstanding from the bottom plate and defining a storage volume, the rim having a lowermost edge attached to the bottom plate and an uppermost edge terminating in a horizontal flange extending outward from the storage volume. The receptacle and horizontal flange being so dimensioned that the horizontal flange engages the ridge near the top of the cooler chamber and the bottom plate is suspended below the ridge by the horizontal flange.

4. The cooler insert assembly according to claim 3, in which a notch is provided in the horizontal flange for passing therethrough a lid holding element connecting the cooler to a cooler lid.

5. The assembly according to claim 2, in which the protuberances extend vertically downward from the top flange along the side panel at least part way to the bottom panel.

6. The assembly according to claim 1, in which the protuberances extend vertically from an upper edge of the long side panels downward at least part way to the bottom panel.

* * * * *